(12) United States Patent
Forshaw et al.

(10) Patent No.: US 7,797,199 B2
(45) Date of Patent: Sep. 14, 2010

(54) FRAUDULENT ADDRESS DATABASE

(75) Inventors: David Forshaw, Castro Valley, CA (US); Thembile Mtwa, San Francisco, CA (US); Sean Handel, Moss Beach, CA (US)

(73) Assignee: Rearden Commerce, Inc., Foster City, CA (US)

( * ) Notice: Subject to any disclaimer, the term of this patent is extended or adjusted under 35 U.S.C. 154(b) by 493 days.

(21) Appl. No.: 11/293,318

(22) Filed: Dec. 1, 2005

(65) Prior Publication Data

US 2006/0190287 A1 Aug. 24, 2006

(51) Int. Cl.
G06Q 30/00 (2006.01)
G06Q 10/00 (2006.01)

(52) U.S. Cl. .......................................... 705/26; 705/28
(58) Field of Classification Search ........................ None
See application file for complete search history.

(56) References Cited

U.S. PATENT DOCUMENTS

| 6,304,850 | B1 | 10/2001 | Keller et al. | |
|---|---|---|---|---|
| 6,714,918 | B2 * | 3/2004 | Hillmer et al. | 705/18 |
| 7,050,987 | B2 | 5/2006 | Lettovsky et al. | |
| 7,080,019 | B1 | 7/2006 | Hurzeler | |
| 7,263,506 | B2 * | 8/2007 | Lee et al. | 705/38 |
| 2002/0161701 | A1 * | 10/2002 | Warmack | 705/39 |
| 2002/0194119 | A1 * | 12/2002 | Wright et al. | 705/38 |
| 2003/0055723 | A1 * | 3/2003 | English | 705/14 |
| 2003/0177020 | A1 | 9/2003 | Okamura | |
| 2005/0060210 | A1 * | 3/2005 | Levi et al. | 705/5 |
| 2006/0190287 | A1 | 8/2006 | Forshaw | |
| 2008/0091445 | A1 | 4/2008 | Mihic | |

OTHER PUBLICATIONS

Orttung, Mark et al., U.S. Appl. No. 11/178,007, entitled "System for Travel Services Resource Sharing", filed Jul. 7, 2005.
Transaction History of U.S. Appl. No. 11/178,007, filed Jul. 7, 2005, entitled "System for Travel Services Resource Sharing."
Transaction History of U.S. Appl. No. 11/293,318, filed Dec. 1, 2005, entitled "Fraudulent Address Database."
Transaction History of U.S. Appl. No. 11/549,961, filed Oct. 16, 2006, entitled "Method and System for Dynamic Social Networking Based on Similar Travel Itineraries."

* cited by examiner

*Primary Examiner*—F. Ryan Zeender
*Assistant Examiner*—Asfand M Sheikh
(74) *Attorney, Agent, or Firm*—Greenberg Traurig, LLP

(57) ABSTRACT

One embodiment of the present invention provides a system and method to collect information about potentially suspect addresses across many members of a commerce platform or a fraudulent address database system, thus reducing the chance of exposure to fraudulent charges for merchants providing services as members.

14 Claims, 2 Drawing Sheets

FRAUDULENT ADDRESS DATABASE

RELATED APPLICATIONS

The present application is related to U.S. application Ser. No. 10/966,556, entitled "System for Optimization of Cost Management," filed Oct. 15, 2004, which is incorporated herein by reference.

BACKGROUND OF THE INVENTION

Scams on the Internet have unfortunately become an everyday occurrence. They typically involve credit card scams and the shipping of merchandise. In some cases, merchandise is sent to unsuspecting people who have been hired to "transship" goods bought fraudulently, for the purpose of masking the real destination address. In other cases the scam artists simply operate out of their facilities, obtaining credit card information, which is then used to make fraudulent purchases. One common thread throughout these scams is that the shipping address is often used in a series of scams until the scam artist moves on. Therefore, receiving an early warning about certain shipping addresses would allow merchants to reduce their exposure. Unfortunately, some merchants are often not aware of problems with specific addresses, even though some other merchants may be aware of them, and credit card companies do not always share such information openly with merchants and other e-trade participants.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

One embodiment of the present invention provides a system and method to collect information about potentially suspect addresses across many members of a commerce platform or a fraudulent address database system, thus reducing the chance of exposure to fraudulent charges for merchants providing services as members.

One common element in almost all these crimes is that the product is shipped to an address that is used fraudulently. Typically, the credit card company makes sure to check that shipping is to a billing address or to a "registered" shipping address (if the shipping address is different from the billing address, it often must be pre-registered). However, for clever scam artists, it is not too difficult to get an alternative shipping address registered, which may go undetected for quite some time before the credit card company stops processing transactions to that address. As mentioned earlier, such scams may be further compounded by the fact that an address of unsuspecting contractors retained for trans-shipping services may be used for only days or weeks. Also, in some cases, "shipping address" may not be used for actual shipping, as is often the case with travel related products and services (for example e-tickets, e-vouchers etc.) The novel art of this disclosure can be used to flag fraudulent addresses that have been used in the past, or very recently, and are, therefore, suspect. By exchanging information about these addresses, merchants using this system may get an advanced warning at the time they are preparing a shipment, that is, before the merchandise is shipped and the damage is done.

Figure 1:
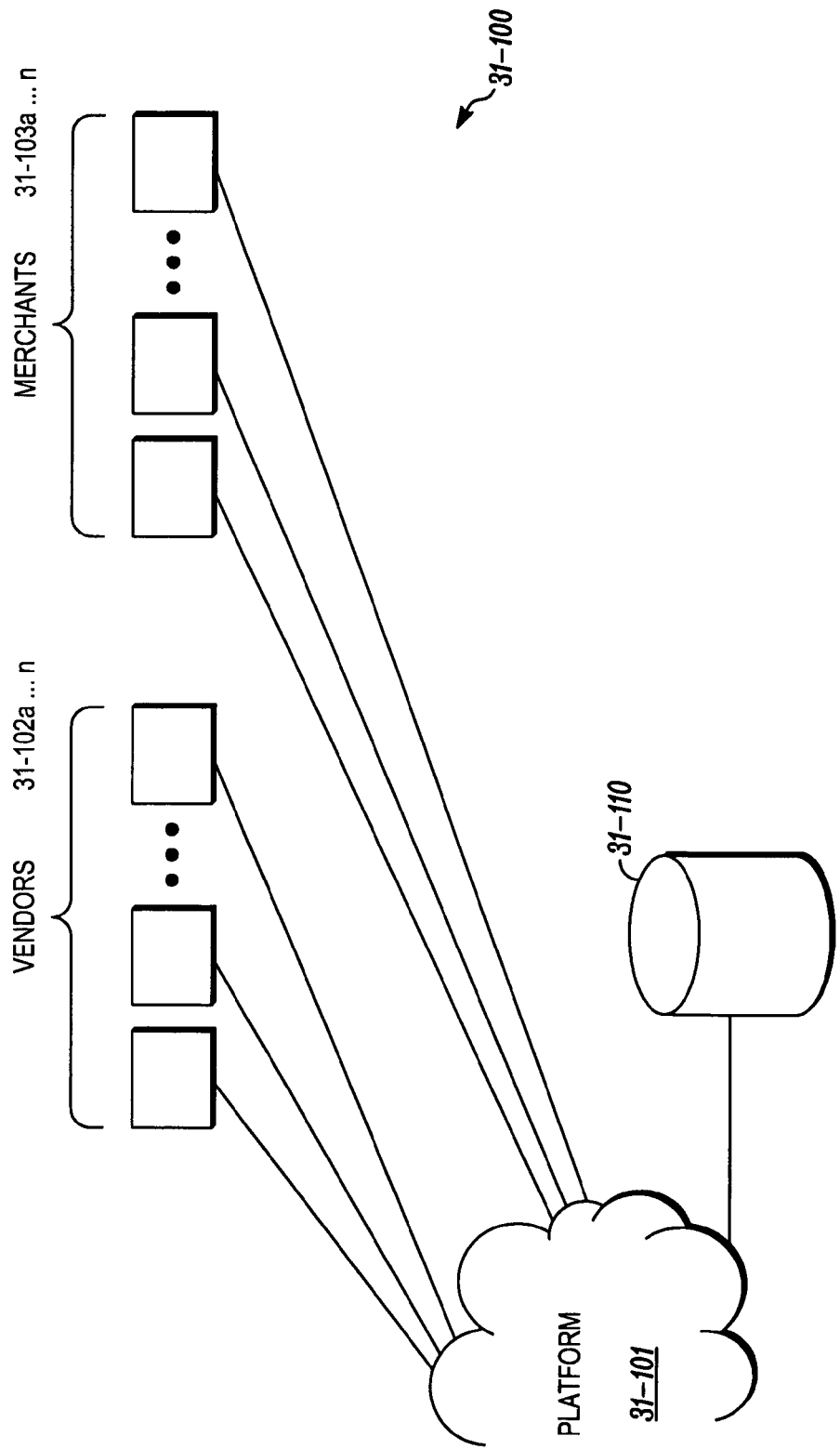
FIG. 1 shows overview of the architecture in accordance with one embodiment.

FIG. 1 shows an overview of a services transaction system 31-100, including a service platform 31-101, such as the Rearden Service Platform (RCP), vendors (airlines, carrier or shipping services, etc.) 31-102*a-n*, and merchants (as customers or members of the system) 31-103*a-n*. Also shown is a database 31-110, which contains all the data necessary for the RCP 31-101.

Figure 2:
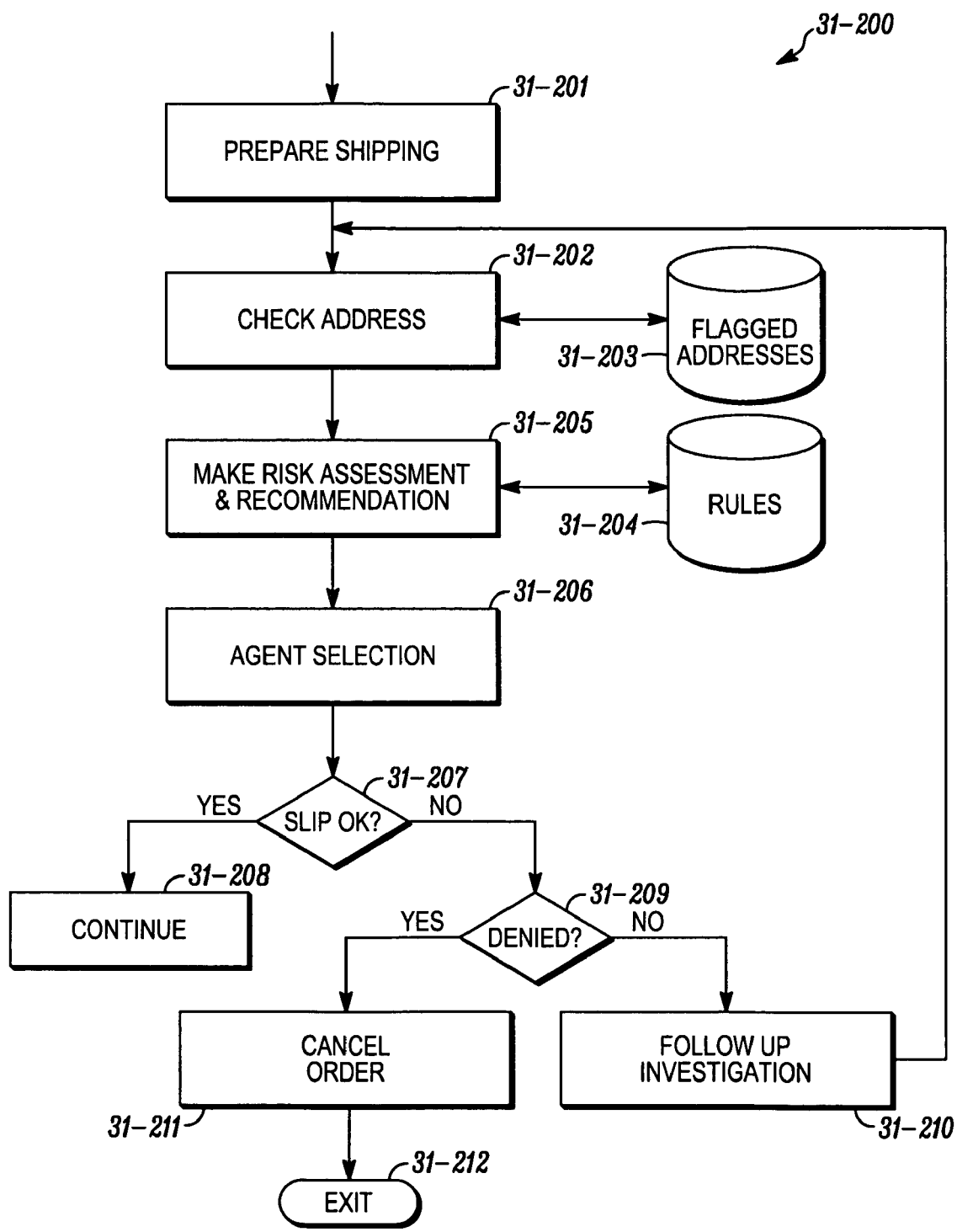
FIG. 2 shows an example of a statistical analysis program in accordance with one embodiment.

FIG. 2 shows an exemplary process flow 31-200 of software used to warn service platform participants of potential problem addresses. When a shipment is prepared in step 31-201, the software checks the shipping address in step 31-202 against the flagged addresses in database 31-203 (which typically would be a subset of the main database 31-110 and would consolidate data from many participants). It is clear that some kind of information exchange agreement must be signed by all the participants (vendors and merchants) in the RCP 31-101 to allow this information to be exchanged in a format that protects private information about participants and their customers, but at the same time allows flagging of addresses that are potentially fraudulent. Based on the information obtained in step 31-202, in step 31-205 the system performs a risk assessment, using rules in another sub-database 31-204, which contains such rules. Said rules could be universally applicable rules for all participants, accepted as part of the above-mentioned agreement, or they could be rules specific to each company and its particular types and likelihood of risk exposure.

Based on the risk assessment, in step 31-206 an agent decides whether to continue processing the order without any further action or to investigate the shipping address further. In some cases, the agent may be an automated software agent using the rules mentioned above; in other cases, the decision may be flagged for review by a human agent. At step 31-207, the process branches, depending on the agent decision made in step 31-206. If the decision is YES, OK to ship, the shipping process continues in step 31-208 and the involvement of this software instance terminates. If the decision is NO, then in step 31-209 it is determined whether to cancel the order because of a high risk of fraud. If YES, then in step 31-211 the order is canceled and the end user is most likely notified that the order is cancelled and told why. If NO because the risk level is in a gray zone, then in step 31-210, a follow up investigation is launched. For example, the system may send an email to the card holder or to the credit department of the merchant to request further investigation and to ask for additional information to verify identity of the party at the shipping address; or an employee may call the credit card holder to verify that the order is valid and made with his permission. Such a call may be made from a out-bound contact center, which are well known in the art and are not limited to phone calls, but may include other media types, such as fax, chat, instant messaging, SMS, etc. After this follow-up information has been collected and deposited in the database, typically DB 31-203, assuming that the shipping address is valid and legitimate, the process loops back to step 31-202, where the address is checked again and the validation process repeats.

In one embodiment, addresses are flagged after credit card transactions have been retroactively denied and credit card charges have been disputed. In another embodiment, addresses whose residents initiate a lot of disputes about credit cards may be included in the database. Often people who engage in fraudulent activity or in an abusive pattern of disputes may change credit cards and vendors, but remain at the same address. Thus flagging those addresses may help merchants (and credit card companies) to avoid or reduce the risk of doing business with parties at those addresses. Additional checks may be in place for identity of the current tenants, etc.

In yet another aspect, users can rate merchants about being unfairly blocked. In yet other cases, merchants can have a peer review, in that, for example, if an address has been flagged as "bad", and after lengthy review a second merchant disagrees and rates the address good (for example after dispute with his client), a pattern of "wrongly blocked" addresses may emerge of the doing of some careless merchants, and hence merchants may be rated themselves, attaching a quality rating to a "bad address" flag based on the merchant(s) flagging a particular address.

It is clear that many modifications and variations of this embodiment may be made by one skilled in the art without departing from the spirit of the novel art of this disclosure. In particular, this address verification may be used also for other types of service and or product transaction, for example including but not limited to e-tickets, e-vouchers, e-coupons, on-line registrations etc.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer implemented method comprising:
   in response to processing a purchase transaction conducted over a communications media, comparing, via a computing device, a shipping address associated with the purchase transaction to a set of prohibited shipping addresses previously identified;
   in response to a match between the shipping address and one of the set of prohibited shipping addresses, performing, via the computing device, a risk assessment associated with the purchase transaction based on a set of predefined rules;
   receiving notification from a first merchant about a fraudulent shipping address associated with a purchaser, the fraudulent address included in the set of prohibited shipping addresses;
   allowing a plurality of merchants to disagree with the notification from the first merchant about the fraudulent shipping address;
   receiving, via a computing device, a first rating from the purchaser about the first merchant based on perceived correctness of the notification from the first merchant about the fraudulent shipping address;
   receiving, via the computing device, a second rating from a second merchant of the plurality of merchants about the first merchant based on perceived correctness of the notification from the first merchant about the fraudulent shipping address; and
   creating a quality rating associated with the notification from the first merchant about the fraudulent shipping address based on disagreement from the plurality of merchants.

2. The method of claim 1, further comprising, in response to the performing the risk assessment, terminating the purchase transaction prior to completion.

3. The method of claim 2, wherein the terminating includes stopping shipment of a purchased item to the shipping address associated with the purchase transaction.

4. The method of claim 1, wherein the communications media is a network connection.

5. The method of claim 1, further comprising, in response to the performing the risk assessment, launching an additional investigation into the purchase transaction.

6. The method of claim 1, wherein a separate set of predefined rules is used to perform the risk assessment based on a vendor associated with the purchase transaction.

7. The method of claim 1, wherein the purchaser is associated with credit card disputes or fraudulent activity.

8. A machine-readable medium having stored thereon a set of instructions which when executed by a computing device perform a method comprising:
   in response to processing a purchase transaction conducted over a communications media, comparing a shipping address associated with the purchase transaction to a set of prohibited shipping addresses previously identified;
   in response to a match between the shipping address and one of the set of prohibited shipping addresses, performing a risk assessment associated with the purchase transaction based on a set of predefined rules;
   receiving notification from a first merchant about a fraudulent shipping address associated with a purchaser, the fraudulent address included in the set of prohibited shipping addresses;
   allowing a plurality of merchants to disagree with the notification from the first merchant about the fraudulent shipping address;
   receiving a first rating from the purchaser about the first merchant based on perceived correctness of the notification from the first merchant about the fraudulent shipping address;
   receiving a second rating from a second merchant of the plurality of merchants about the first merchant based on perceived correctness of the notification from the first merchant about the fraudulent shipping address; and creating a quality rating associated with the notification from the first merchant about the fraudulent shipping address based on disagreement from the plurality of merchants.

9. The machine-readable medium of claim 8, wherein the method further comprises, in response to the performing the risk assessment, terminating the purchase transaction prior to completion.

10. The machine-readable medium of claim 9, wherein the terminating includes stopping shipment of a purchased item to the shipping address associated with the purchase transaction.

11. The machine-readable medium of claim 8, wherein the communications media is a network connection.

12. The machine-readable medium of claim 8, wherein the method further comprises, in response to the performing the risk assessment, launching an additional investigation into the purchase transaction.

13. The machine-readable medium of claim 8, wherein a separate set of predefined rules is used to perform the risk assessment based on a vendor associated with the purchase transaction.

14. A computer system comprising:
   at least one server configured for:
      comparing a shipping address associated with a purchase transaction to a set of prohibited shipping addresses previously identified, in response to processing a purchase transaction conducted over a communications media; and
      performing a risk assessment associated with the purchase transaction based on a set of predefined rules, in response to a match between the shipping address and one of the set of prohibited shipping addresses;
      receiving notification from a first merchant about a fraudulent shipping address associated with a purchaser, the fraudulent address included in the set of prohibited shipping addresses;
      allowing a plurality of merchants to disagree with the notification from the first merchant about the fraudulent shipping address;
      receiving a first rating from the purchaser about the first merchant based on perceived correctness of the notification from the first merchant about the fraudulent shipping address;
      receiving a second rating from a second merchant of the plurality of merchants about the first merchant based on perceived correctness of the notification from the first merchant about the fraudulent shipping address; and
      creating a quality rating associated with the notification from the first merchant about the fraudulent shipping address based on disagreement from the plurality of merchants.

* * * * *